(12) United States Patent
Kleinodt et al.

(10) Patent No.: US 9,344,029 B2
(45) Date of Patent: May 17, 2016

(54) ASYNCHRONOUS MOTOR UNIT COMPRISING A FREQUENCY CONVERTER WITH ELECTRICAL ISOLATION IN THE DC VOLTAGE INTERMEDIATE CIRCUIT

(71) Applicant: KD ELEKTRONIKSYSTEME GMBH, Zerbst (DE)

(72) Inventors: Ralf Kleinodt, Zerbst (DE); Uwe Gehlert, Rudolstadt (DE)

(73) Assignee: KD ELEKTRONIKSYSTEME GMBH (DE)

( * ) Notice: Subject to any disclaimer, the term of this patent is extended or adjusted under 35 U.S.C. 154(b) by 0 days.

(21) Appl. No.: 14/363,744

(22) PCT Filed: Dec. 7, 2012

(86) PCT No.: PCT/EP2012/074758
§ 371 (c)(1),
(2) Date: Jun. 6, 2014

(87) PCT Pub. No.: WO2013/083761
PCT Pub. Date: Jun. 13, 2013

(65) Prior Publication Data
US 2014/0346998 A1    Nov. 27, 2014

(30) Foreign Application Priority Data
Dec. 7, 2011  (EP) .................................... 11192287

(51) Int. Cl.
*H02P 27/04*        (2006.01)
*H02M 5/458*       (2006.01)
(Continued)

(52) U.S. Cl.
CPC ............... *H02P 27/04* (2013.01); *H02M 5/225* (2013.01); *H02M 5/458* (2013.01); *H02M 7/53871* (2013.01); *H02P 27/06* (2013.01)

(58) Field of Classification Search
CPC ....................................................... H02P 27/04
USPC ......................................... 318/757, 808, 727
See application file for complete search history.

(56) References Cited

U.S. PATENT DOCUMENTS 4,719,550 A    1/1988  Powell et al.
5,694,307 A *  12/1997 Murugan ......................... 363/37
(Continued)

FOREIGN PATENT DOCUMENTS

DE        203 442         10/1983
DE    40 26 955  A1       3/1992
(Continued)

OTHER PUBLICATIONS

International Search Report mailed Jun. 19, 2013, issued in connection with corresponding International Application No. PCT/EP2012/074758 (8 pages total).

(Continued)

*Primary Examiner* — David S Luo
(74) *Attorney, Agent, or Firm* — Karin L. Williams; Mayer & Williams PC

(57) ABSTRACT

The invention relates to an asynchronous motor unit including a frequency converter for regulating the asynchronous motor. The frequency converter comprises an input-side, uncontrolled bridge rectifier, a DC voltage intermediate circuit and an output-side inverter. According to the invention, the DC voltage intermediate circuit furthermore comprises a DC-to-DC converter with galvanic isolation, with the result that electrical isolation between the bridge rectifier and the inverter is produced.

20 Claims, 1 Drawing Sheet

(51) Int. Cl.
*H02M 5/22* (2006.01)
*H02M 7/5387* (2007.01)
*H02P 27/06* (2006.01)

(56) References Cited

U.S. PATENT DOCUMENTS

| | | | | |
|---|---|---|---|---|
| 5,793,623 | A * | 8/1998 | Kawashima et al. | 363/56.05 |
| 6,157,556 | A * | 12/2000 | Wobben | 363/132 |
| 6,531,842 | B2 * | 3/2003 | LeDoux et al. | 318/629 |
| 7,468,595 | B2 * | 12/2008 | Lee | H02P 1/04 |
| | | | | 318/801 |

FOREIGN PATENT DOCUMENTS

| | | |
|---|---|---|
| DE | 100 12 799 A1 | 9/2001 |
| DE | 10 2005 016 962 A1 | 11/2006 |
| DE | 10 2005 042 319 A1 | 3/2007 |
| DE | 10 2009 007 522 A1 | 8/2010 |
| EP | 0474060 A2 | 3/1992 |
| EP | 1139559 A1 | 10/2001 |
| EP | 1 921 738 A2 | 5/2008 |
| WO | 2006/108535 A1 | 10/2006 |
| WO | 2010/089186 A2 | 8/2010 |

OTHER PUBLICATIONS

Xiaohong Wang et al: "Power electronic technology in wind generation system of variable speed-constant frequency", Power Electronics Systems and Applications, 2009. PESA 2009. 3rd International Conference on, IEEE, Piscataway, NJ, USA, (May 20, 2009), Seiten 1-6, XP031523848, ISBN: 978-1-4244-3845-7 (6 pages total).

Anne Roc'h et al: "Investigation of the Coupling Paths of a Galvanically Isolated AC/AC Converter", Electromagnetic Compatibility, 2007. ISEMC 2007. IEEE International Symposium on, IEEE, PI, (Jul. 1, 2007), Seiten 1-6, XP031136360, ISBN: 978-1-4244-1349-2 (6 pages total).

Chuanhong Zhao et al: "A novel three-phase three-port UPS employing a single high-frequency isolation transformer", Power Electronics Specialists Conference, 2004. PESC 04. 2004 IEEE 35th Annual, Aachen, Germany Jun. 20-25, 2004, Piscataway, NJ, USA,IEEE, US, Bd. 6, (Jun. 20, 2004), Seiten 4135-4141, XP010739066, DOI: 10.1109/PESC.2004.1354730 ISBN: 978-0-7803-8399-9 (7 pages total).

* cited by examiner

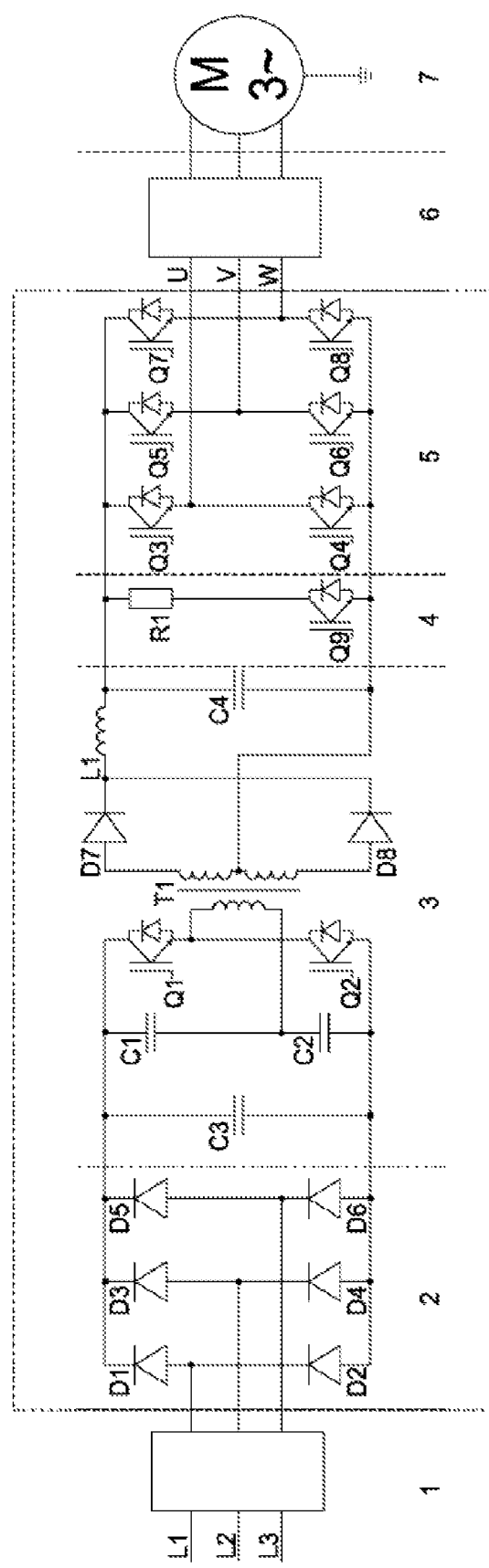

ASYNCHRONOUS MOTOR UNIT COMPRISING A FREQUENCY CONVERTER WITH ELECTRICAL ISOLATION IN THE DC VOLTAGE INTERMEDIATE CIRCUIT

FIELD OF THE INVENTION

The invention relates to an asynchronous motor unit with a frequency converter. Such a frequency converter comprises an uncontrolled bridge rectifier, a DC current or DC voltage intermediate circuit, and an inverter. Thus, the mains voltage can be converted by single or multiple phase into an alternating voltage with variable amplitude and/or frequency.

BACKGROUND OF THE INVENTION

Various converter topologies for reversible power flow are known from DE 40 26 955 C2. This deals with all possible kinds of energy converters, such as DC to DC converters, AC to DC converters, and AC to AC converters. Source and consumer are connected via semiconductor switches with an intermediate circuit with a storage element. Certain actuating principles and switching frequency periods are used to connect source and consumer alternately with the storage element. The storage element can be an HF transformer that galvanically isolates source and consumer.

Frequency converters enable a continuous setting of the speed of an asynchronous motor between zero and the rated speed with approximately constant torque. The actuating of other motors is also possible in theory. Frequency converters are used with preference, for example, in the field of climate control for regulating the air and volume flow of pumps, fans and compressors, in hoisting and conveying, and in the field of servo-drives.

Frequency converters can be adapted by their parameters to the particular motor being regulated. For example, a controllable-speed three-phase motor is known from DE 100 12 799 C2, which is designed to operate with a suitable frequency converter. The three-phase motor has a storage component as an "electronic nameplate", in which the relevant motor data for the converter is kept. The converter can automatically read in the motor type as well as its data when placed in operation, so that the regulated parameters can be suitably chosen.

Various converter topologies are also known from wind power plants. For example, these are described by WANG, YANG, WU and HU in "Power Electronic Technology in Wind Generation System of Variable Speed—constant Frequency" (2009, 3rd International Conference on Power Electronics System and Application or in EP 1 921 738 A2.

A control circuit for a three-phase asynchronous motor is known from DE 10 2009 007 522 B4, in which each of the three mains phases is connected via a phase transistor to at least one of three stator windings of the three-phase asynchronous motor and via one freewheeling transistor each to a freewheeling collector potential. The stator windings are furthermore connected to the anode of one freewheeling diode each. The cathodes of the freewheeling diodes are connected to the freewheeling collector potential. The phase transistors can be switched on and off in any desired manner, without being disturbed by an induction voltage which is greater than the dielectric strength of the phase transistors.

DD 203 442 specifies a power converter system for control of several electrical servomotors with speed independent of each other. The power converter system comprises a frequency converter with a rectifier, a DC voltage intermediate circuit, an inverter and one or more medium-frequency transformers. The one or more medium-frequency transformers are arranged in the frequency converter after the inverter. Depending on the frequency being put out (0 to rated frequency of the motors), these transformers must have a considerable size, which makes them costly and limits the area of application. Furthermore, an externally commutated reversal control circuit is provided between transformer and motor. Due to the steep edges of the alternating voltage pulses at the output of the inverter and the stray capacitances of the motor arrangement, leakage currents arise on the motor bearings, whose outer races are conductively connected to the ground potential via the housing, which can result in destruction of the bearings in the medium term. To prevent this, partially isolated and thus expensive bearings are used in the motors. Owing to the high frequency of the stray leakage currents, however, the isolating effect is often not enough. Voltage peaks relating to the ground potential acting on the stator winding can also damage the motor on account of the high intermediate circuit voltage.

In DE 10 2005 016 962 A1 for the protecting of the bearings of the three-phase machine it is proposed to connect each of the three circuits of the stator isolated from each other to a separate connection point of the frequency converter and to design the frequency converter with a DC intermediate circuit grounded at the midpoint. Thanks to the interplay of the symmetrical stray capacitances and the grounding-symmetrical voltage, at every point in time a symmetrical electrical voltage—in terms of ground potential—should be present between the respective connection points for each circuit. This should prevent bearing currents caused by voltages that are capacitively coupled to the rotor.

Frequency converters with an integrated sine wave filter acting on all poles are known for a "soft operation" of motors. These frequency converters provide a sinusoidal output voltage, so that no bearing currents occur in the motor on account of steep voltage pulse edges. The frequency converter and the integrated sine wave filter must be adapted to the particular motor by the selection of operating modes. Each time the actuation of the power semiconductor is program controlled and modified for the particular application. Such all-pole sine wave filters have a complicate switching and are not suited for a simple connection of various motors.

Many of the frequency converters known from the prior art have to be especially adapted to the particular application in their parameters. At present, this is usually done by a keyboard/display unit, which is present at the converter and enables a navigation in the menu structure. Especially complex converters allow for a programming in a special programming language or through a corresponding graphics program on the PC. Readymade data sets are then loaded into the converter via an interface. It is also customary to save the ready parameter set on a storage medium (such as USB, chip and flash cards), which is inserted into a corresponding interface of the frequency converter and read in by it. Some models can themselves measure the drive characteristics and themselves set their own control parameters during setup (see Wikipedia: frequency converter).

DE 10 2005 042 319 A1 specifies a wide-range converter with a mains-side rectifier and several (n) load-side rectifiers. In the DC voltage intermediate circuit, a step-up/step-down adjusting device is provided with n transmitters, which couple the mains-side to the load-side rectifiers in electrical isolation. The load-side rectifiers are each individually power-optimized to a load. The mains-side and load-side rectifiers are mechanically moved away from each other.

SUMMARY OF THE INVENTION

The problem of the invention, starting from the prior art, is to provide an asynchronous motor unit with a frequency converter for actuation of an asynchronous motor, which can operate with no special adaptation or programming with all power-appropriate types of asynchronous motors, without the windings of the motors suffering damage due to voltage peaks in terms of ground potential or without bearing damage occurring due to relevant leakage currents. The frequency converter required for this should be compact in design and economically manufactured.

The problem is solved with an asynchronous motor unit having the features of claim 1.

An asynchronous motor unit according to the invention comprises an asynchronous motor and a frequency converter. The frequency converter serves for a regulated two-quadrant operation of the asynchronous motor, i.e., operation in both directions of rotation is possible, and it comprises in already known manner an input-side uncontrolled bridge rectifier for rectifying the mains voltage, a direct current intermediate circuit, and an output-side inverter for providing a variable-frequency and optionally variable-amplitude output voltage. The intermediate circuit comprises a capacitor for smoothing out the DC voltage and an inductance for interference suppression. Controlled bridges with power semiconductor switches such as IGBT, MOSFET or switching thyristors, so-called pulse inverters, are used as the inverter.

If a brake operation of the motor is also required, a familiar brake chopper circuit is integrated in the intermediate circuit. A consumer of the brake chopper circuit can also be arranged outside of the frequency converter.

According to the invention, a DC to DC converter with electrical isolation is arranged in the DC voltage intermediate circuit. Thanks to the electrical isolation in the intermediate circuit, an output voltage free of ground potential is available; in this way, voltage spikes relative to the ground potential are especially prevented on the motor winding.

The benefits of the invention are, in particular, that the compact and economical frequency converter can be hooked up with no special adaptation to all types of asynchronous motors of the corresponding power class and still avoid damage to the windings and elevated wear on the bearings of the motor. Advantageously, the circuitry expense for an integrated sine wave filter can be substantially reduced, since steep voltage pulse edges relative to ground potential no longer occur.

Preferred variant embodiments of the invention are indicated in the subclaims.

In one especially preferred embodiment of the invention, the DC to DC converter is designed as a push-pull converter. Push-pull converters are familiar in the field of switched network components.

In an equally preferred embodiment, the DC to DC converter is a push-pull converter with a half-bridge actuation and midpoint circuit. The benefit of the half-bride actuation is to be seen in that the transformer only has to be designed for half the intermediate circuit voltage. Transmission ratio of the transformer and the duty cycle of the half-bridge controls should preferably be chosen so that a nearly constant output voltage is present on the asynchronous motor.

The actuating of the inverter occurs in familiar fashion by appropriate pulse timing of the semiconductor switch by means of a microcontroller, so that an output voltage is provided that corresponds to the requirements of the motor.

A sine-commutated pulse width modulation is customary for the actuating of an asynchronous motor. In this case, precisely three of the six semiconductor switches are always switched on.

Thanks to the electrical isolation in the intermediate circuit, a series connected sine wave filter and/or du/dt filter can be simplified in design and integrated directly in the frequency converter, so that an enormous savings potential is available here.

The grounded asynchronous motor is connected in familiar fashion to the output of the frequency converter by means of an EMC filter at the motor side. The motor-side filter can furthermore comprise filter components for the sine wave filtering and du/dt filtering. Such filters are known to the skilled person in their dimensioning and application.

Thanks to the use of the du/dt filter, a limiting of the voltage rise is accomplished at the time of switching. Losses, heating and leakage currents are lower. The du/dt filter is hooked up between inverter output and motor. It reduces the voltage gradient du/dt on the motor terminals and limits the maximum amplitude of the transient voltage peaks on the motor terminals. Furthermore, load current peaks are reduced in long motor cables.

The sine wave filter in familiar fashion produces from the square-wave voltage pulses at the inverter output a largely sinusoidal output voltage. This substantially reduces the harmonic component in the motor current.

A preferred embodiment of the invention will be explained more closely hereafter by means of the drawing.

BRIEF DESCRIPTION OF THE DRAWINGS

FIG. 1 shows a circuit arrangement of an asynchronous motor unit according to the invention with a frequency converter and with an asynchronous motor.

DETAILED DESCRIPTION

FIG. 1 shows a circuit arrangement of an asynchronous motor unit according to the invention with a frequency converter according to the invention. The frequency converter shown is designed for a power range of up to around 3 kW.

The frequency converter comprises an input-side EMC filter 1, which supplies the three phases L1, L2, L3 of a three-phase mains voltage to a rectifier 2. The rectifier 2 is an uncontrolled 6-pulse bridge rectifier, which is formed in familiar fashion from six mains diodes D1 to D6.

In the DC voltage intermediate circuit there is arranged a DC to DC converter 3 with electrical isolation. The DC to DC converter 3 in the embodiment shown is designed as a push-pull converter with half-bridge actuation by means of semiconductor switches Q1, Q2 (e.g., IGBT switching transistors with freewheeling diode 1200 V/40 A) and midpoint switching at the output (rectifier diodes D7, D8). Four capacitors C1 to C4 serve to smooth out the DC voltage in the intermediate circuit.

Furthermore, a high-frequency transformer T1 is provided in the rectifier intermediate circuit 3, which has a transmission ratio of, for example, $W_p:W_{s1}:W_{s2}=24:28:28$. Since the transformer is operated at high frequency, a small transformer core (such as ETD 59) can be used. A primary winding of the transformer T1 is supplied with the rectified, high-frequency mains voltage that is switched by the semiconductor switches Q1, Q2. A secondary winding of the transformer T1 furnishes the induced voltage to the electrically isolated switching section. For this, a potential is formed by a middle tapping point of the secondary winding, while the other potential is formed by the two ends of the winding, which are placed across two rectifier diodes D7, D8 at the input of an inductance L1. The inductance L1 and a series connected capacitance C4 serve for interference suppression and voltage smoothing of the intermediate circuit 3.

An optional brake chopper circuit 4 serves to dissipate the energy built up in the intermediate circuit by motor braking in familiar manner. The brake chopper circuit 4 comprises at least one switch Q9 with which a consumer R1 can be connected to the intermediate circuit, in order to dissipate excess energy in the brake operation of the motor. The consumer R1 can be arranged inside or outside the frequency converter housing.

A three-phase inverter 5 energized by the secondary winding of the transformer T1 provides an output voltage with variable frequency and amplitude in likewise familiar manner. This occurs by an appropriate actuation (pulsing) of six semiconductor switches Q3 to Q8.

Finally, a motor-side EMC filter 6 is hooked up to the three-phase output voltage of the inverter 5, which is switched between frequency converter and a three-phase asynchronous motor 7. The asynchronous motor 7 can have a power up to 3 kW, for example. A special matching of the described frequency converter to the electrical parameters of the asynchronous motor is no longer required.

LIST OF REFERENCE SYMBOLS 1 mains-side EMC filter
2 three-phase bridge rectifier
3 DC to DC converter
4 brake chopper
5 three-phase inverter
6 motor-side EMC filter
7 three-phase asynchronous motor

The invention claimed is:

1. An asynchronous motor unit comprising an asynchronous motor and a frequency converter, wherein the frequency converter has an input-side uncontrolled bridge rectifier, a DC voltage intermediate circuit, and an output-side inverter, characterized in that the DC voltage intermediate circuit comprises a DC to DC converter with electrical isolation, which provides a potential separation between the bridge rectifier and the inverter; wherein the electrical isolation is formed by a high frequency transformer, which comprises at least one primary winding and one secondary winding.

2. The asynchronous motor unit according to claim 1, wherein the secondary winding has a middle tapping point.

3. The asynchronous motor unit according to claim 1, wherein the DC to DC converter-is a push-pull converter which has a half-bridge actuation and midpoint circuit at its output.

4. The asynchronous motor unit according claim 1, wherein a brake chopper circuit is provided in the DC voltage intermediate circuit.

5. The asynchronous motor unit according to claim 1, wherein the frequency converter furthermore comprises an output-side sine wave filter and an output-side du/dt filter.

6. The asynchronous motor unit according to claim 1, wherein the frequency converter is designed to regulate the asynchronous motor unit, wherein the bridge rectifier is an uncontrolled bridge rectifier.

7. The asynchronous motor unit according to claim 1, wherein the frequency converter is designed to regulate the asynchronous motor unit, wherein the secondary winding preferably has a middle tapping point.

8. The asynchronous motor unit according to claim 1, wherein the frequency converter is designed to regulate the asynchronous motor unit, wherein the DC to DC converter is a push-pull converter.

9. The asynchronous motor unit according to claim 1, wherein the frequency converter is designed to regulate the asynchronous motor unit, wherein the push-pull converter comprises a half-bridge actuation.

10. The asynchronous motor unit according to claim 1, wherein the frequency converter is designed to regulate the asynchronous motor unit, wherein the push-pull converter has a midpoint circuit at its output.

11. The asynchronous motor unit according to claim 1, further comprising a brake chopper circuit in the intermediate circuit.

12. The asynchronous motor unit according to claim 1, further comprising an output-side sine wave filter.

13. A frequency converter suitable to regulating an asynchronous motor, comprising an input-side bridge rectifier, a DC voltage intermediate circuit, and an output-side inverter, wherein the DC voltage intermediate circuit comprises a DC to DC converter with electrical isolation, which provides a potential separation between the bridge rectifier and the inverter, wherein the bridge rectifier is an uncontrolled bridge rectifier, wherein the electrical isolation is formed by a high frequency transformer, which comprises at least one primary winding and one secondary winding.

14. The frequency converter according to claim 13, wherein the secondary winding has a middle tapping point.

15. The frequency converter according to claim 13, wherein the DC to DC converter is a push-pull converter.

16. The frequency converter according to claim 15, wherein the push-pull converter comprises a half-bridge actuation.

17. The frequency converter according to claim 15, wherein the push-pull converter has a midpoint circuit at its output.

18. The frequency converter according to claim 13, further comprising a brake chopper circuit in the intermediate circuit.

19. The frequency converter according to claim 13, further comprising an output-side sine wave filter.

20. The frequency converter according to claim 13, further comprising an output-side du/dt filter.

* * * * *